No. 893,344. PATENTED JULY 14, 1908.
J. A. MINEAU.
LEVELING INSTRUMENT.
APPLICATION FILED SEPT. 7, 1907.

Witnesses:

Inventor
Joseph A. Mineau
By James L. Norris
Atty.

UNITED STATES PATENT OFFICE.

JOSEPH A. MINEAU, OF MOUNTAIN HOME, IDAHO.

LEVELING INSTRUMENT.

No. 893,344.      Specification of Letters Patent.      Patented July 14, 1908.

Application filed September 7, 1907. Serial No. 391,802.

*To all whom it may concern:*

Be it known that I, JOSEPH A. MINEAU, a citizen of the United States, residing at Mountain Home, in the county of Elmore and State of Idaho, have invented new and useful Improvements in Leveling Instruments, of which the following is a specification.

My present invention relates to improvements in leveling instruments, and it has for its object to provide an instrument of this character that is simple in construction, enabling it to be manufactured and sold at a reasonable cost, and its parts are not liable to get out of order, and which in practice is self-adjusting so that an artificial horizon, or a plane at any desirable angle thereto may be instantly determined, the instrument being especially adapted for use in leveling land, laying out ditches for drainage or irrigating purposes, and is adapted for use in numerous other instances wherein the results of the instrument will be sufficiently accurate.

A further object of the invention is to provide simple means for locking the sighting tube in any set or adjusted position so that it may not be deflected by wind or other causes.

To these and other ends, the invention consists in certain improvements, combination and arrangement of parts, all as will be hereinafter described, the novel features being pointed out particularly in the claims at the end of the specification.

Figure 1:
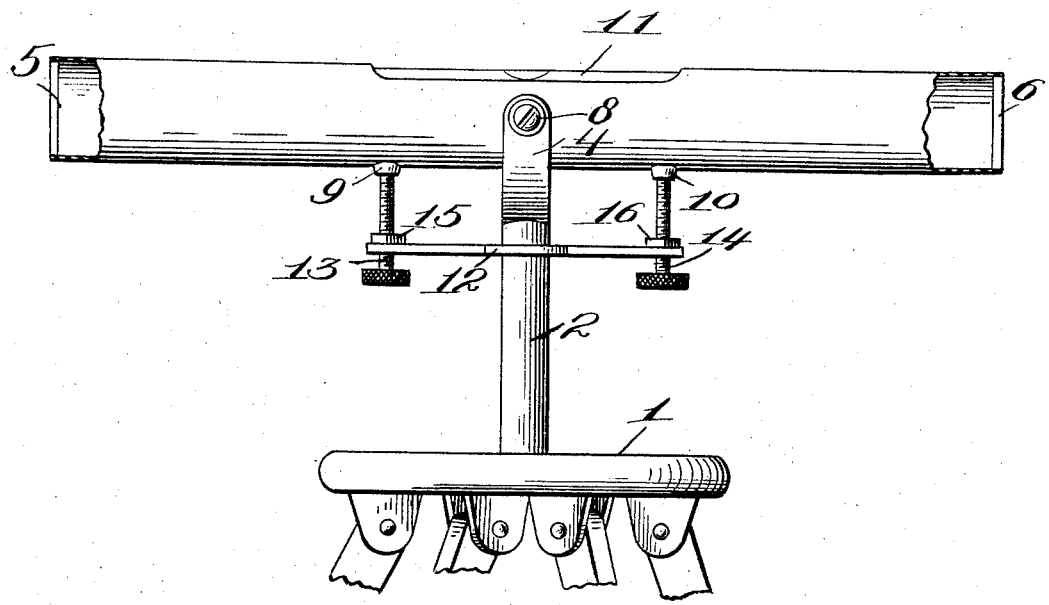
Figure 2:
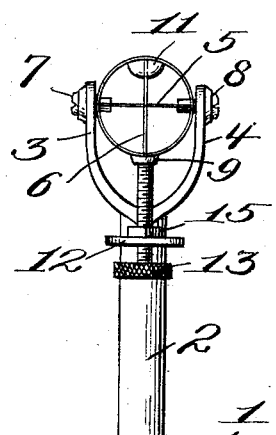

In the accompanying drawing, Figure 1 is a side elevation of a leveling instrument constructed in accordance with the present invention, portions being broken away at the opposite ends of the sighting tube to illustrate the cross-wires therein. Fig. 2 represents an elevation of the instrument shown in Fig. 1.

Similar parts are designated by the same numeral references in the several figures.

The instrument shown in the present embodiment of my invention is preferably mounted upon a suitable tripod 1 generally of the type used on transits, and it has a vertical standard 2 thereon provided at its upper end with a yoke which provides a pair of bearing arms 3 and 4. It also embodies a sighting tube which in the more expensive class of instruments is provided with lenses, but in order to cheapen the cost of manufacture, it is provided in the present instance with pairs of cross wires 5 and 6 which are arranged in the opposite ends of the tube, the vertical and horizontal wires of each pair intersecting preferably in alinement with the axis of the tube. The tube is freely suspended for tilting movement in a vertical plane by a pair of pivots 7 and 8 which are arranged in alinement and extend in a direction at right angles to the longitudinal axis of the tube. These pivots may be of any suitable construction, those shown in the present instance being composed of screws threaded into the respective bearing arms on the standard and extending to the opposite side walls of the tube permitting the latter to swing freely in a vertical plane.

The sighting tube is preferably self-adjusting, that is to say, it has a normal tendency to assume a true horizontal position, and this result may be accomplished in several ways, such for instance as weighting the under side of the tube. This weighting effect may be accomplished by offsetting the axis of the transverse pivots slightly above the longitudinal center of the tube, and in addition, a pair of bosses 9 and 10 are spaced equal distances on opposite sides of the transverse axis of the tube, and the position of the sighting tube is indicated by a level which may be of any suitable construction, that shown in the present instance comprising a spirit-level 11 which extends longitudinally of the axis of the tube and is inserted in the upper portion thereof, a portion of the upper wall of the tube being cut away to enable a reading of the level to be had.

It is generally preferable to provide means for locking the sighting tube in the different set positions, and the devices for accomplishing this purpose as shown in the present instance comprise a cross arm 12 which is rigidly supported on the standard 2 and projects on the opposite sides thereof in a direction parallel to the sighting tube, and in the opposite ends of this cross arm are mounted a pair of vertically adjustable locking screws 13 and 14, the upper ends of which are in alinement with and adapted to engage the under sides of the bosses 9 and 10 respectively on the sighting tube, so that after the latter has been adjusted relative to the tripod, these screws may be turned until their upper ends rest against the under sides of the bosses, and when the screws are so adjusted, the sighting tube is locked from movement about its transverse axis. The lock nuts 15 and 16 coöperate with the screws and the upper sides of the cross arm 12 to prevent accidental turning of the screws while in locked position.

A leveling instrument constructed in accordance with the present invention may be manufactured cheaply, and is capable of being used with facility in laying out the grade or pitch of ditches, tunnels and the like, or in leveling land, foundations, and for various other purposes where extreme accuracy is not necessary, the sighting tube being so mounted in the present instance that it will automatically assume a true horizontal position irrespective of the position of the tripod or support due to irregularities in the ground upon which it rests, and the sighting tube may be positively locked from movement by means of a simple and easily operable locking device.

I claim as my invention:

1. In a leveling instrument, the combination with a supporting standard provided with bearing arms at its upper end, and a pair of oppositely arranged pivots on said arms, of a sighting tube mounted on said pivots with its center of gravity below the axis of said pivots and having a normal tendency to assume a true horizontal position, a level carried by said tube for indicating the actual position thereof, and vertically adjustable devices arranged on the standard at opposite sides of the pivots of the tube for locking the latter in different positions relatively to the standard.

2. In a leveling instrument, the combination with a standard having a pair of bearing arms at its upper end, of an adjustable sighting tube mounted between the arms, a pair of oppositely arranged pivots carried by the bearing arms and coöperating with the tube to pivotally support it, a level fitted in the upper wall of the tube, a cross arm rigid on the standard, and vertically adjustable devices on the opposite ends of the cross arm for locking the sighting tube in different adjusted positions relatively to the standard.

In testimony whereof I have hereunto set my hand in presence of two subscribing witnesses.

JOSEPH A. MINEAU.

Witnesses:
EDMUND M. WOLFE,
LOUIS E. NICHOLSON.